(12) United States Patent
Heuver

(10) Patent No.: US 11,283,312 B2
(45) Date of Patent: Mar. 22, 2022

(54) ELECTRIC MACHINE TORQUE KEY WEDGES

(71) Applicant: Ford Global Technologies, LLC, Dearborn, MI (US)

(72) Inventor: Bradley Ronald Heuver, South Lyon, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 187 days.

(21) Appl. No.: 16/559,768

(22) Filed: Sep. 4, 2019

(65) Prior Publication Data
US 2021/0066977 A1    Mar. 4, 2021

(51) Int. Cl.
*H02K 1/18* (2006.01)
*H02K 7/00* (2006.01)
*H02K 5/24* (2006.01)

(52) U.S. Cl.
CPC ............. *H02K 1/185* (2013.01); *H02K 5/24* (2013.01); *H02K 7/006* (2013.01)

(58) Field of Classification Search
CPC .......... H02K 1/185; H02K 7/006; H02K 5/24; Y02T 10/64
USPC ................................. 310/402, 431, 432, 433
See application file for complete search history.

(56) References Cited

U.S. PATENT DOCUMENTS

| | | | |
|---|---|---|---|
| 4,634,909 A | 1/1987 | Brem | |
| 6,597,081 B2* | 7/2003 | Dawson | H02K 1/185 310/254.1 |
| 6,775,900 B2* | 8/2004 | Dawson | H02K 1/185 29/596 |
| 7,923,890 B2* | 4/2011 | Boardman, IV | H02K 1/185 310/216.129 |
| 7,982,356 B2 | 7/2011 | Buban | |
| 8,138,654 B2* | 3/2012 | Boardman, IV | H02K 1/185 310/216.129 |
| 8,829,769 B1* | 9/2014 | Rao | H02K 11/40 310/432 |
| 10,148,147 B2 | 12/2018 | Tanavde et al. | |
| 2001/0013736 A1* | 8/2001 | Blakelock | H02K 3/487 310/214 |
| 2010/0295407 A1* | 11/2010 | Boardman, IV | H02K 1/185 310/216.113 |
| 2010/0295408 A1* | 11/2010 | Boardman, IV | H02K 1/185 310/216.113 |
| 2011/0121680 A1* | 5/2011 | Boardman, IV | H02K 1/185 310/216.129 |
| 2021/0066977 A1* | 3/2021 | Heuver | H02K 1/185 |

* cited by examiner

*Primary Examiner* — John K Kim
(74) *Attorney, Agent, or Firm* — David Kelley; Brooks Kushman, P.C.

(57) ABSTRACT

A stator system for an electric vehicle motor may include a stator having a torque key extending axially from a first stator end, a case configured to surround the stator and defining a case opening to receive the torque key, the case defining a keyway between the torque key and the case opening, a torque key mechanism arranged within the keyway, wherein the torque key mechanism includes a pair of reciprocally aligned wedges defining a channel through at least one of the wedges, and a bolt insertable at the channel and configured to engage the channel to move at least one wedge and create an interference fit of the torque key mechanism within the keyway to attach the stator to the case.

20 Claims, 3 Drawing Sheets

ELECTRIC MACHINE TORQUE KEY WEDGES

TECHNICAL FIELD

Disclosed herein are stator attachment mechanisms.

BACKGROUND

Electric machines, including electric generators, motors, sirens, etc., may include a stator surrounding a rotor. The stator may be attached to a case and energy may flow through the stator to or from the rotor. It is important to have a strong attachment between the stator and the case so that the system may withstand the rotational forces created by the rotor.

SUMMARY

A stator system for an electric vehicle motor may include a torque key mechanism configured to be inserted into a keyway defined by a stator and a case, the torque key mechanism including a first wedge configured to cooperate with a second wedge, wherein each wedge is configured to receive a respective portion of a bolt configured to adjust the collective force exerted on the stator and case to forcibly fix the torque key between the stator and the case.

A stator system for an electric vehicle motor may include a first torque key mechanism configured to be inserted into a keyway defined by a stator and a case at a first end of the stator and defining a first channel, a second torque key mechanism configured to be inserted into the keyway at an opposite end of the first torque key mechanism and defining a second channel, and a bolt configured to be received by the first channel and the second channel and upon actuation, pull at least a portion of the first torque key mechanism and the second torque key mechanism inward to wedge the torque mechanisms into the keyway to attach the stator to the case.

A stator system for an electric vehicle motor may include a stator having a torque key extending axially from a first stator end, a case configured to surround the stator and defining a case opening to receive the torque key, the case and torque key defining a keyway there between, a torque key mechanism arranged within the keyway, wherein the torque key mechanism includes a pair of reciprocally aligned wedges defining a channel through at least one of the wedges, and a bolt insertable at the channel and configured to engage the channel to move at least one wedge and create an interference fit of the torque key mechanism within the keyway to attach the stator to the case.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

Figure 1:
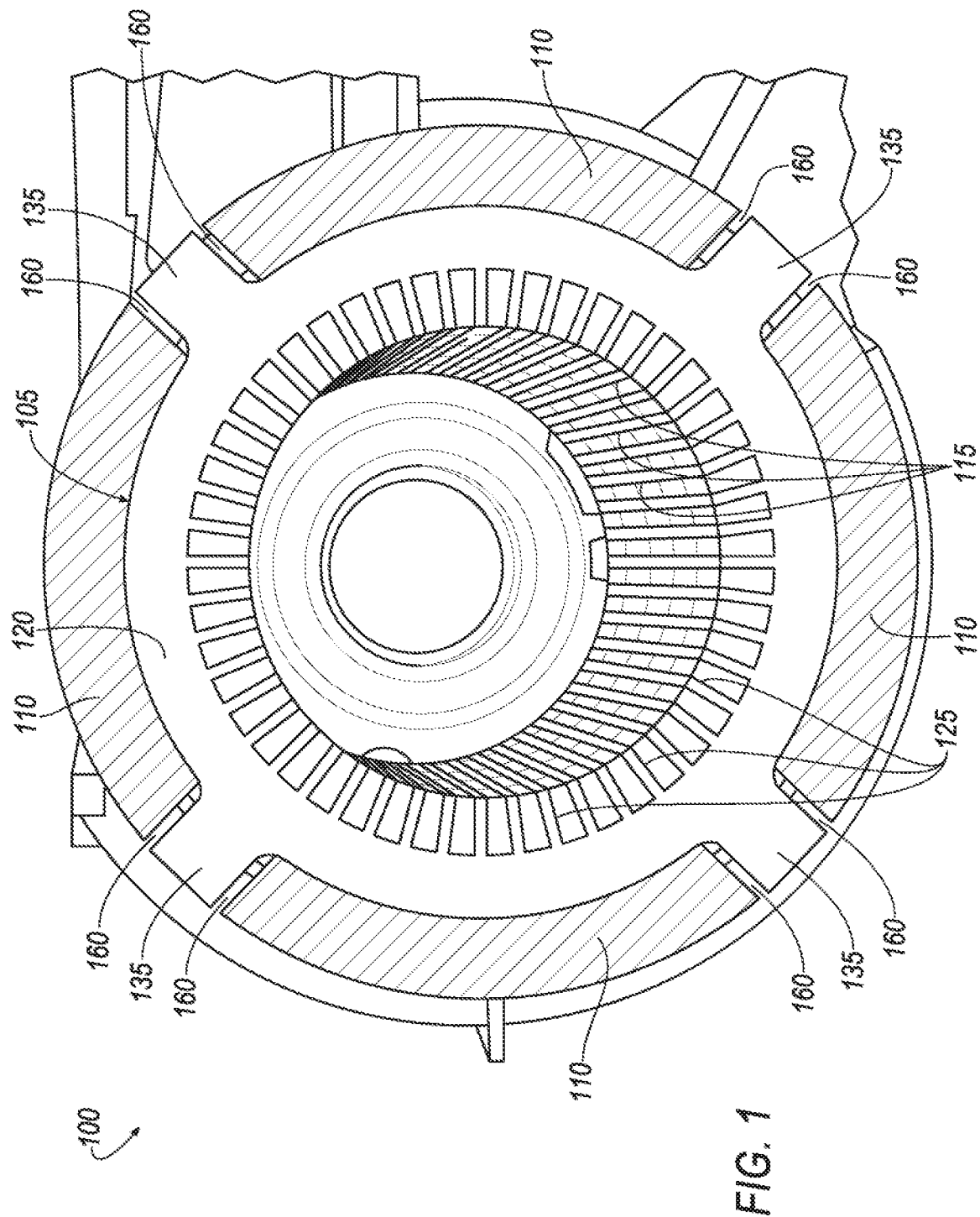
FIG. 1 illustrates an example stator system.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Stators for electric machines cooperate with a rotor and are attached to a case. Oftentimes, the stator is press fit into the case to maintain the stator therein and to keep the stator from rotating when subjected to rotor forces during operation. However, such press fitting may introduce compressive stresses in the back iron of the stator. Such stresses affect the magnetic properties of the stator and may result in loss of efficiency for the motor. On the other hand, the press fit adds significant structural strength to the case. Thus, keeping the strength provided by the press-fit while decreasing the stress created by the same, would increase efficiency while maintaining durability.

The stator in a battery electric vehicle (BEV) may carry too much torque to react against a press fit aluminum case when thermal expansion is considered. A torque key on the stator may be arranged in a slot within the housing to react to the torque and prevent the stator from rotating. However, to install such keys, an opening needs to slope inward. These openings may have variable dimensions and such keys are subject to movement within the slot, which may cause wear and tear on the key, as well as noise, vibration, and harshness (NVH) issues. Bolting in stators to the case may also cause NVH issues and have stiffness challenges. Press fitting may create stresses on the back iron and may reduce motor efficiency.

Disclosed herein is a torque key mechanism configured to mount the stator to a case to aid in the torque capability of the joint by increasing the stiffness of the housing and other mounts. The torque key mechanism may allow for variable gaps within a keyway defined by the case and stator to be filled, thus preventing any movement within the keyway. This lowers the wear and tear on the key mechanism and the machine in general, as well as eliminates some of the NVH issues that could arise.

The torque key may include a pair of wedges configured to mate with one another and adjust their collective force applied to the stator and case by adjusting the collective height of the wedges in order to create an interference fit within the keyway. A single wedge pair may include a bolt that draws the two wedges together to increase their collected height to fill the keyway. This example may include a thread actuated channel configured to receive the bolt and actuate the wedges upon rotation of the bolt. This example may be arranged at one side of the keyway.

Another example may include two wedge pairs, one on each side of the keyway at each of the front and back of the stator. In this example, a bolt may extend through one of the wedges at the front and one of the wedges at the back to draw the wedges inward. The other of the pair of wedges may be substantially fixed due to a lip. Upon drawing these wedges inward, the wedges are press fit into the keyway and fill any gap created by a difference in the keyway size with the torque key mechanism.

Each of these examples increase the stiffness of the stator and housing connection and improve NVH performance. Any press fitting of the stator may be eliminated as well, though some examples may continue to press fit the stator to the case in combination with the use of a torque key.

The disclosed wedge mechanism may be used in addition to other stator mounting methods, such as bolting or light press fits. This may allow the mechanism to aid in the torque capability of the joint and increase the stiffness of the housing and associated mounts.

FIG. 1 illustrates a perspective view of an example stator system 100 including a stator 105 and a case 110 for an electric motor of a motor vehicle. The motor vehicle may be an electric vehicle (EV) including a hybrid electric vehicle (HEV) powered both by fuel and electricity, a plug-in hybrid electric vehicle (PHEV), and a battery electric vehicle (BEV). In electric vehicles, the efficiency of the motor may be very important and inefficiencies in the motor may cause a decrease in driving range.

The stator 105 may be configured to act as a magnet to allow energy to form and flow therethrough in an electric motor. The stator 105 may be made of iron, aluminum, steel, copper, etc. The stator 105 may be made of a plurality of laminations 115 that are placed side-by-side and stacked to form the disk-like circular form of the stator 105. The laminations 115 may form a back iron 120 of the stator 105. The back iron 120 may be a solid portion around the outer periphery of the stator 105. Each lamination 115 may also form teeth 125 extending radially inward from the back iron into the center of the stator 105. When aligned and stacked, the teeth 125 extend axially along a length of the stator. The stator teeth 125 may be configured to maintain coils therebetween (not shown).

The case 110 may be configured to surround and house the stator 105. The case 110 may be affixed to the stator 105 such that the case may maintain the stator 105 in a fixed position while the rotor (not shown) may rotate relative to the stator 105. The case 110 may surround the back iron 120 of the stator 105.

At least some of the laminations 115 of the stator 105 may form various axial attachment points in the form of a stator key 135 that protrude radially outwardly along the outer periphery of the back iron 120. These stator keys 135 may be configured to be received, at least partially, within openings 160 defined by the case 110. The stator key 135 may extend axially along the stator 105 from a first side, or front, of the stator 105 to a second side, or back, of the stator, forming an elongated protrusion.

The case openings 160 may surround the stator key 135 and define a keyway 145 (labeled in FIGS. 2 and 3) between an edge of the case 110 that defines the openings 160 and the stator key 135. While the examples herein illustrate a keyway 145 defined on each side of the stator key 135, only one keyway 145 may be present for each stator key 135. Further, the example in FIG. 1 illustrates four stator keys 135. However, it may be recognized that more or less stator keys 135 may be included axially along the stator 105. The stator keys 135 may be equidistantly spaced around the back iron at one or more axial locations.

As previously described, compressive stress caused by press-fitting of the stator 105 into the case 110 may affect the magnetic characteristics of the stator and decrease the efficiency of the motor. Further, the BEV may carry too much torque to reacted against the press-fit case 110. This may be especially the case when thermal expansion is realized. Traditional torque keys may be used to react to the torque and prevent the stator from rotating. However, this requires a sloped keyway between the stator 105 and the case 110 which could cause the key to move back and force, thus causing wear and tear, as well as NVH issues.

Figure 2:
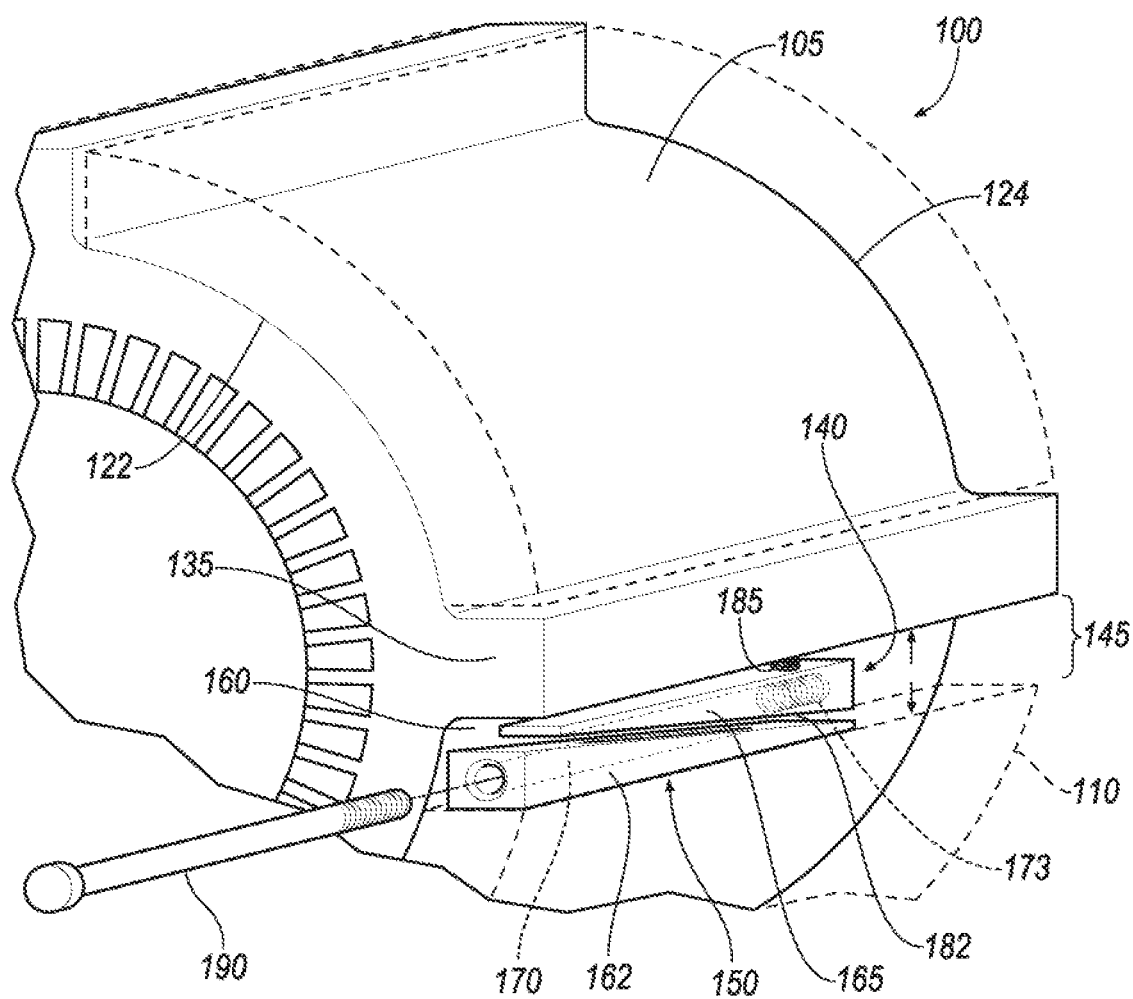
FIG. 2 illustrates a partial perspective view of an example stator system including a torque key mechanism.

FIG. 2 illustrates a partial perspective view of an example stator system 100 including a torque key mechanism 140.

The torque key mechanism 140 may include at least one wedge mechanism 150 configured to be received within the keyway 145. The example illustrated in FIG. 2 shows the wedge mechanism 150 residing within the keyway 145 and flush or near flush with the first side, or front, of the stator 105.

The wedge mechanism 150 may include a pair of wedges including a first wedge 162 and a second wedge 165. Each wedge 162, 165 may have an inclined plane connecting two sides forming a right angle opposite of the inclined plane. The incline of the first wedge 162 may, in the installed state, extend upward from the first side of the stator 105. The incline of the second wedge 165 may, in the installed state, extend downward from the front of the stator 105. That is, the first and second wedges 162, 165 may reciprocally mate or align with each other within the keyway 145.

The first and second wedge 162, 165 may define a channel 170 extending through each of the wedges 162, 165. The channel 170 may extend parallel with the stator key 135 and may open at a proximal end 180 of the first wedge 162 at the first side of the stator 105. The channel 170 may extend through the wedges 162, 165 to a distal end of the second wedge 165. The wedges could be made of steel, aluminum, powdered metal, or any other material of sufficient strength for the threaded portion.

The channel 170 may be configured to receive a bolt 190. The channel 170 may include threads 173 to engage with the bolt 190. The threads 173 may be thread actuated whereby actuation of the bolt may engage the threads 173 to cause a movement of the wedges 162, 165. Upon receiving the bolt, the wedges 162, 165 may be held in fixed relation to each other. That is, the wedges 162, 165 may be forced apart by the bolt 190 and may define a gap 182 between the inclined planes of the wedges 162, 165. Upon actuation, or rotation, of the bolt 190, the wedges 162, 165 may be pulled together to decrease the size of the gap 182. As the wedges 162, 165 move inward toward the other of the wedges 162, 165, the gap 182 decreases and the collective height of the wedges 162, 167 increases. The torque key mechanism 140 may then be installed once the height of the wedges causes the torque key mechanism 140 to be wedged and fit within the keyway 145. The channel 170, while illustrated to form a round tunnel, may define other shapes to allow for movement of the bolt 190 within the channel 170. For example, the channel 170 may define a wider portion in some areas to allow the bolt 190 to move as the wedges 162, 165 are brought together upon actuation of the bolt 190. In one example, a portion of the channel 170 may have a cross-section in the shape of an oval, or allow the bolt 190 to move vertically.

During installation, the wedges 162, 165 may be mated together by aligning the inclines of the first wedge 162 and the second wedge 165. The bolt 190 may then be inserted through the channel 170 at a proximal end and may maintain the wedges 162, 165 at a fixed position with respect to each other. The gap 182 between the wedges may be small enough to allow the torque key mechanism 140 to be inserted into the keyway 140. The bolt 190 may be threaded and configured to engage the threads 173 of the channel 170. Once inserted into the keyway 145, the bolt 190 may be rotated or turned in an effort to pull the wedges 162, 165 together via the thread actuated channel 170 and expand the wedge height against the stator key 135 and the case 110. Thus, any open space between the wedge mechanism 140 and the stator key 135 or case 110 may be eliminated by the force extending outwardly at the wedge mechanism 140.

A biasing member 185, such as a spring, may be arranged at one side of the wedge mechanism 140. The biasing member 185 may further aid in biasing the wedge mechanism 140 within the keyway 145 in an effort to further fit the wedge mechanism 140 within the keyway 145. This may be especially helpful in the case of thermal expansion and add a degree of compliance to the wedge mechanism 140.

Furthermore, additionally or alternatively, the wedges 162, 165 may be mated within the keyway 145. The second wedge 165 may be inserted into the keyway at the front of the stator 105. Subsequently, the first wedge 162 may then be inserted so that the incline of the first wedge 162 abuts that of the second wedge 165. The channel 170 may then receive the bolt 190 and the two wedges 162, 165 may be connected and subsequently driven inward towards each other to create an interference fit (e.g., friction fit) within the keyway 145.

While the wedge mechanism 140 is illustrated as being arranged at the front or first end 122 of the stator 105, the wedge mechanism 140 could additionally or alternatively be arranged at the back 125 of the stator 105. The wedge mechanism 140 may be maintained within the keyway 145 and abut the stator key 135 and the side of the case opening 160 to maintain a fit between the stator 105 and the case 110.

Figure 3:
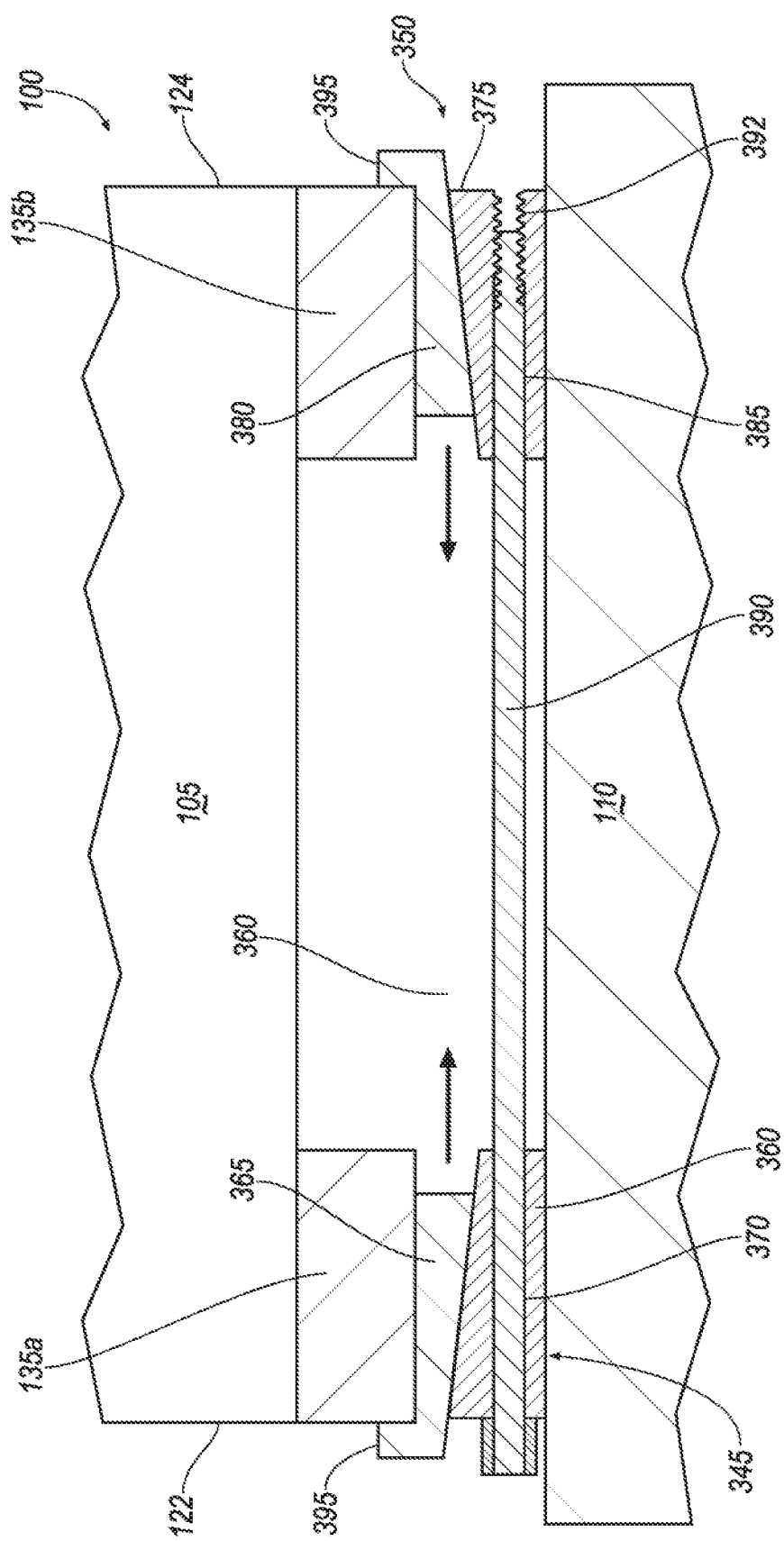
FIG. 3 illustrates a partial perspective view of another example stator system 100 including at least one other example of a torque key mechanism.

FIG. 3 illustrates a partial perspective view of another example stator system 100 including at least one torque key mechanism 140. In the example shown in FIG. 3, the stator key 135 may include a pair of stator keys, including a first stator key 135*a* arranged at the first end 122 of the stator 105 and a second stator key 135*b* arranged at the second end 124 of the stator. Unlike the example stator key 135 shown in FIG. 2 that extends axially from the first end 122 to the second end 124 of the stator 105, the example in FIG. 3 illustrates an opening between the pair of stator keys 135*a*, 135*b*. Each configuration of stator keys 135 could be applied to the examples in each figure, however, and does not necessarily correspond to the torque key mechanism specific to each embodiment.

In this example, a wedge mechanism is arranged at each side of the stator 105. A first wedge mechanism 345 arranged at the first end 122 of the stator and may include a first wedge 360 and a second wedge 365. Similar to the example of FIG. 2, the first and second wedges 360, 365 may have opposing inclined planes configured to mate, align, or abut each other during installation. The first wedge 360 may define a first channel 370 configured to receive a bolt 390.

The second wedge 365 may include a lip 395 configured to extend from the proximal end of the second wedge 365 and engage a portion of the stator key 135 at the front of the stator. Similar to the example of FIG. 2, the incline of the first wedge 360 may, in the installed state, may extend upward from the first end 122 of the stator 105. The incline of the second wedge 365 may, in the installed state, extend downward from the first end 122 of the stator 105. That is, the first and second wedges 162, 165 may reciprocally mate with each other within the keyway 145.

The second wedge mechanism 350 may be arranged at the second end 124 of the stator 105, or the opposite side of the first wedge mechanism 345. The second wedge mechanism 350 may include a third wedge 375 and a fourth wedge 380. The third wedge 375 may define a second channel 385 configured to receive a portion of the bolt 390. The second channel 385 may include threads 392 and be configured to engage with a threaded portion (not shown) of a distal end of the bolt 390.

The fourth wedge 380 may be similar to that of the second wedge 365 and may include a lip 395 configured to engage with the back of the stator 105. The inclined planes of the third and fourth wedges 375, 380 may mate and abut each other.

During installation, the first wedge mechanism 345 may be inserted at the first end 122 of the stator 105. The second wedge mechanism 350 may be inserted at the second end 124 of the stator 105. The bolt 390 may be inserted into the first channel 370 at the first side of the stator 105. The bolt 390 may extend through the first channel 370 and through a cavity 330 between the first and second wedge mechanism 345, 350. Once through the cavity 330, the bolt 390 may be inserted into the third wedge 375 of the second wedge mechanism 350. The second channel 385 may receive the bolt and the threads of the bolt 390 may engage with the threads 382 of the second channel 385. As the bolt 390 is actuated or rotated, the threading may pull the third wedge 375 inward from the second side of the stator 105. Subsequently, the fourth wedge 380 may also be pulled inward slightly. The lip 395 may act as a stop, however, and prevent the fourth wedge 380 from moving with the third wedge 375.

As the third wedge 375 is pulled into the cavity, the incline of the third wedge 375 will move along the incline of the fourth wedge 380. Thus, the collective height of the third and fourth wedges 375, 380 will begin to increase to fit the second wedge mechanism 350 within the keyway 145.

Actuation of the bolt 390 will also force the first wedge 360 inward. Similarly, the second wedge 365 will be stopped from sliding with the first wedge 360 via the lip 395. As the first wedge 360 is pulled into the cavity, the first and second wedges 360, 365 may bias against one another and an outward force may be applied at the stator key 135 and the case 110, thus wedging and ultimately securing the first wedge mechanism within the keyway 145. With a single bolt and single actuation motion, both the first and second wedge mechanism 345, 350 may engage and provide structure and rigidity to the stator 105 and case 110.

Thus, disclosed herein is a torque key mechanism configured to reduce the compressive stress on the stator, increase stiffness, and allow for variable keyway dimensions, all while increasing motor efficiency, avoiding unnecessary wear and tear, and decreasing NVH issues.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A stator system for an electric vehicle motor, comprising:
   a torque key mechanism configured to be inserted into a keyway defined between a stator and a case,
   the torque key mechanism including a first wedge having a first inclined plane and a second wedge having a second inclined plane, wherein the first inclined plane of the first wedge is configured to cooperate and exert force on the second inclined plane of the second wedge, wherein each wedge is configured to receive a respective portion of a bolt configured to, upon actuation, pull the first inclined plane into the second inclined plane to adjust a collective force exerted on the stator and case to forcibly fix the torque key between the stator and the case.

2. The system of claim 1, wherein the second wedge includes a lip configured to abut a portion of the stator to maintain the torque key mechanism in a fixed position within the keyway.

3. The system of claim 1, wherein each of the first wedge and the second wedge define a channel configured to receive the bolt.

4. The system of claim 3, wherein the channel defined by the second wedge includes a plurality of threads configured to engage with a plurality of threads of the bolt.

5. The system of claim 4, wherein actuation of the bolt upon engagement of the threads within the channel creates a thread actuated engagement configured to decrease a gap between the first and second wedges and increase the collective force exerted by the first and second wedges.

6. The system of claim 1, further comprising a biasing member arranged between the stator and the second wedge to further bias the torque key mechanism within the keyway.

7. A stator system for an electric vehicle motor, comprising:
a first torque key mechanism configured to be inserted into a keyway defined between a stator and a case at a first end of the stator, the first torque key mechanism defining a first channel,
a second torque key mechanism configured to be inserted into the keyway at an opposite end of the first torque key mechanism, the second torque key mechanism defining a second channel, and
a bolt configured to be received by the first channel and the second channel and upon actuation, pull at least a portion of the first torque key mechanism and the second torque key mechanism inward to wedge the torque mechanisms into the keyway to attach the stator to the case.

8. The system of claim 7, wherein the first torque key mechanism includes a first wedge configured to reciprocally align with a second wedge, wherein first wedge defines the first channel.

9. The system of claim 8, wherein during actuation of the bolt, the second wedge maintains a fixed position within the keyway and the first wedge moves inward.

10. The system of claim 9, wherein the second wedge includes a lip configured to abut a portion of the stator to maintain the second wedge in a fixed position within the keyway.

11. The system of claim 8, further comprising at least one biasing member arranged between the stator and the second wedge to further bias the torque key mechanism within the keyway.

12. The system of claim 7, wherein the second torque key mechanism includes a third wedge and a fourth wedge configured to reciprocally align with the third wedge, wherein the third wedge defines the second channel and has a plurality of threads configured to engage the bolt during actuation.

13. The system of claim 7, wherein the first torque key mechanism is configured to abut a first torque key on the stator, and the second torque key mechanism is configured to abut a second torque key on the stator.

14. A stator system for an electric vehicle motor, comprising:
a stator having a torque key extending axially from a first stator end;
a case configured to surround the stator and defining a case opening to receive the torque key, the case and torque key defining a keyway therebetween;
a torque key mechanism arranged within the keyway, wherein the torque key mechanism includes a pair of reciprocally aligned wedges defining a channel through at least one of the wedges; and
a bolt insertable at the channel and configured to engage the channel to move at least one wedge and create an interference fit of the torque key mechanism within the keyway to attach the stator to the case.

15. The system of claim 14, wherein the torque key mechanism includes a first wedge configured to reciprocally align with a second wedge, wherein each wedge is configured to receive a portion of a bolt to decrease a space between the first and second wedges upon actuation to forcibly fix the torque key between the stator and the case.

16. The system of claim 14 further comprising a second torque key mechanism configured to be inserted at an end of the keyway opposite that of the torque key mechanism.

17. The system of claim 16, wherein each of the torque key mechanisms include the pair of wedges defining the channel.

18. The system of claim 17, wherein each channel is configured to receive a bolt, the bolt configured to move at least one wedge of each of the torque key mechanisms inward to wedge the torque mechanisms into the keyway to attach the stator to the case.

19. The system of claim 18, wherein the torque key includes a first torque key at a first end of the stator and a second torque key at a second end of the stator, the torque key mechanism configured to abut the first torque key, and the second torque key mechanism configured to abut the second torque key.

20. The system of claim 14, further comprising at least one biasing member arranged between the torque key and the torque key mechanism within the keyway.

* * * * *